Figure 1:
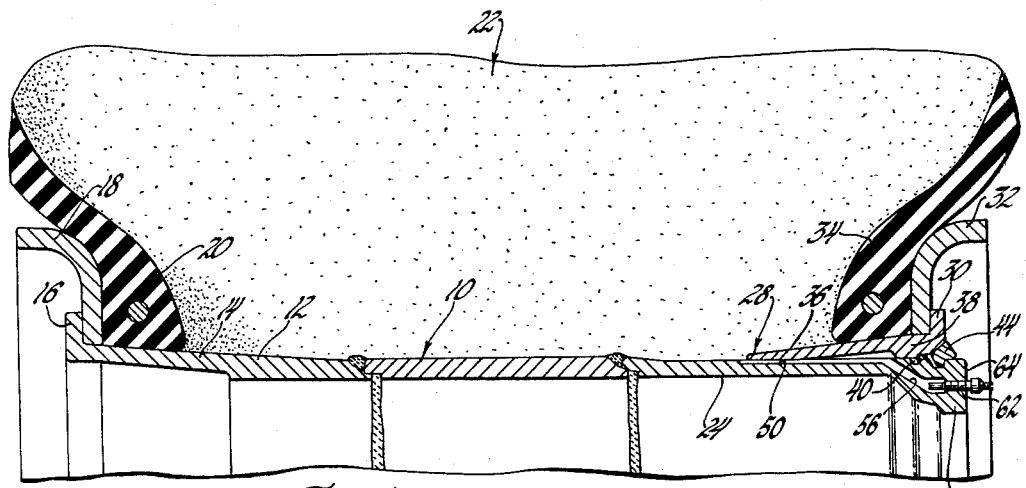

Feb. 18, 1964 — R. H. SCOTT — 3,121,455
VEHICLE WHEEL
Filed Jan. 10, 1961

INVENTOR.
Robert H. Scott
BY Herbert Furman
ATTORNEY

United States Patent Office 3,121,455
Patented Feb. 18, 1964

3,121,455
VEHICLE WHEEL
Robert H. Scott, Wickliffe, Ohio, assignor to General Motors Corporation, Detroit, Mich., a corporation of Delaware
Filed Jan. 10, 1961, Ser. No. 81,782
2 Claims. (Cl. 152—427)

This invention relates to vehicle wheels and more particularly to an air supply and exhaust means for vehicle wheels of the type particularly adapted for use with tubeless tires.

The air supply and exhaust means of this invention is particularly intended for use with tubeless tires mounted on multi-piece vehicle wheel rims of the type intended for use with heavy duty vehicles. In general, such wheel rims usually comprise an annular rim base having an annular edge portion or gutter portion, an annular bead seat band surrounding an annular section of the base and a portion of the annular edge portion or gutter portion, and an annular locking ring removably received within an annular groove provided in the edge portion or gutter portion to axially locate the annular band on the rim base. In the past, the air supply and exhaust means for the tubeless tire has usually comprised a valve stem and core assembly connected to the rim base inwardly of the annular band and the annular edge portion or gutter portion. In certain installations, the stem had to be unusually long so that the outer end thereof was accessible, and difficulties have often been encountered in sealing the stem to the rim base, since the sealing means was often flexible in order that the stem would not be broken from the rim base upon engagement of the stem with a hard object.

The air supply and exhaust means of this invention is of relatively simple construction and obviates the need for any valve stem and the difficulties encountered through the use thereof. In the preferred embodiment of the invention, a radially outwardly opening axially extending groove is provided in the rim base adjacent the annular edge portion or gutter portion thereof. The annular bead seat band closes the major portion of this groove so that the uncovered axially inner portion thereof is located to the interior of the tubeless tire. An enclosed passage in the annular edge portion or gutter portion is joined to the axially outer end of the groove, and a valve core of known type is threadedly received within a tapped portion of this passage to control the flow of air or fluid to and from the interior of the tire. Thus, there are no cumbersome valve stems projecting from the axially inner portion of the rim base, and further there are no sealing difficulties encountered by the use of such stems.

The primary object of this invention is to provide a new and improved air supply and exhaust means for vehicle wheels. Another object of this invention is to provide a new and improved air supply and exhaust means for vehicle wheels of the type particularly adapted for use with tubeless tires. A more specific object of this invention is to provide a new and improved air supply and exhaust means for vehicle wheels of the heavy-duty multi-piece type particularly adapted for use with tubeless tires.

Figure 2:
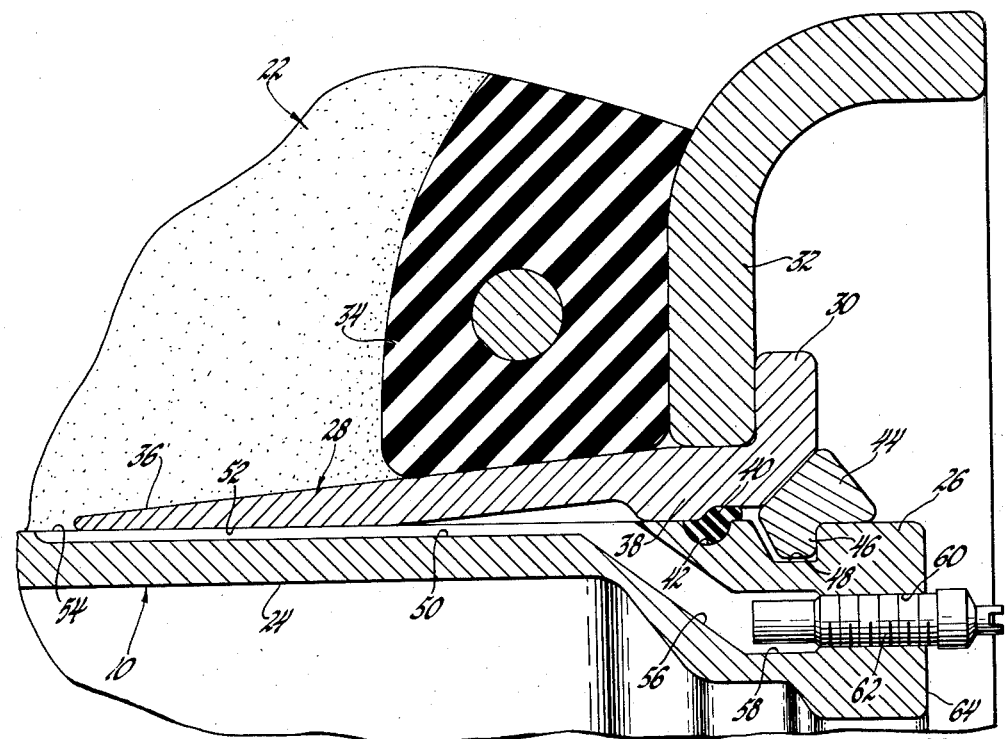

These and other objects of the invention will be readily apparent from the following specification and drawings wherein:

FIGURE 1 is a fragmentary axial sectional view of a vehicle wheel embodying an air supply and exhaust means according to this invention; and FIGURE 2 is an enlarged view of a portion of FIGURE 1.

Referring now particularly to FIGURE 1 of the drawings, a rim base 10 is comprised of a number of annular sections rigidly joined together. The axially inner end section 12 of the base 10 includes a radially outwardly facing and axially inwardly tapered annular surface 14 which terminates in a radially outwardly extending annular flange 16 which locates and seats a main rim flange 18. One bead 20 of a tubeless type tire 22 seats on the surface 14 and against the rim flange 18.

The axially outer end section 24 of the rim base 10 includes a thickened annular edge portion or gutter portion 26. An annular bead seat band 28 is telescopingly received on the end section 24 and includes a radially outwardly extending annular flange 30 which seats and locates a main rim flange 32 telescopingly received on the band 28. The other bead 34 of the tire 22 seats on the radially outwardly facing and axially inwardly tapered annular surface 36 of the member 28 against the rim flange 32. Member 28 further includes a radially inwardly extending annular rib 38 which seats on the section 24 and deforms an O ring 40 mounted in a groove 42 of the section 24 so as to provide an air tight seal between the band 28 and rim base 10. A generally triangularly shaped split annular locking ring 44 seats on the section 24 and on the band 28 adjacent the flange 30 thereof and includes a radially inwardly extending annular rib 46 received within a generally complementary shaped radially outwardly opening gutter or groove 48 of the section 24.

A radially outwardly opening and axially extending narrow shallow groove 50 is provided in the section 24 of the rim base 10. As best shown in FIGURE 2, the groove extends axially inwardly to a greater extent than does the band 28 so that the axially inner portion of the groove is open to the interior of the tire 22. The major portion of the groove is closed by the radially inner surface 52 of the member 28 which seats on the radially outer surface 54 of the section 24 of the rim base. The axially outer end of the groove 50 is joined to a radially inwardly and axially outwardly extending enclosed passage 56, the axially outer end of which merges into an axially outwardly extending enclosed passage 58 having a threaded wall portion 60. A valve core 62 of known type and construction is threadedly mounted within the threaded portion 60 of the passage 58 and extends slightly axially outwardly of the axially outer face 64 of the section 24.

From the foregoing description, it is believed apparent that fluid, such as air, may be supplied to and exhausted from the interior of the tire 22 through the groove 50, the passages 56 and 58 and the valve core 62. The groove 50 may be made as large as desired, depending of course on the thickness of the annular section 24, and likewise the passages 56 and 58 may also be made as large as possible depending on the thickness of the annular gutter or edge portion 26.

As is well known, there is difficulty in obtaining an initial large volume supply of air or fluid to seat the tire beads 20 and 34 on the wheel rim. Subject, of course, to the above noted limitations, it is possible by use of this invention to obtain an initial large supply of air or fluid to seat the tire beads and thereby overcome the difficulty often encountered with a conventional valve stem and core assembly. Further, it will be noted that there is no cumbersome long valve stem projecting axially outwardly of the wheel from an intermediate portion of the rim base 10, and further that there are no sealing difficulties in sealing the air supply and exhaust means for the tubeless tire since all that is required with the subject invention is a common type sealer between the core 62 and the threaded portion 60 of the passage 58. The core 62 projects only slightly beyond the axially facing surface 64 of the rim base, and accordingly is not likely to be broken or otherwise destroyed in service. However, if repairs to the core 62 are necessary, the core can very easily be replaced within a minimum amount of time and without the need of dismounting the wheel from the vehicle.

Thus, this invention provides a new and improved air supply and exhaust means for vehicle wheels.

I claim:

1. A multi-piece wheel rim, comprising, in combination, an annular rim base having an annular section terminating in a thickened annular edge portion, a radially opening annular groove in said annular edge portion, a radially opening axially extending groove in said annular section terminating at one end thereof adjacent said annular groove, passage means enclosed within said edge portion and including a first axial section located radially inwardly of said annular groove and a second axially inwardly and radially outwardly opening section opening to said one end of said axially extending groove, an annular member surrounding said annular section and overlying the major portion of said axially extending groove to define a second passage therewith, an annular ring seated in said annular groove to axially locate said annular member with respect to said axially extending groove, a tubeless type tire having one bead thereof seated on said rim base and the other bead thereof seated on said annular member to locate the uncovered portion of said axially extending groove inwardly of said tire, and fluid control means controlling the flow of fluid through said passage means and said second passage.

2. A multi-piece wheel rim comprising, in combination, an annular rim base including an annular edge portion, a radially open axially extending groove in said rim base terminating at the axially outer end thereof inwardly of said edge portion, passage means enclosed within said edge portion and including a first axially extending passage located radially inwardly of and axially outwardly with respect to said groove and having the axially outer end thereof opening to the axially outer face of said edge portion and the axially inner end thereof opening to a generally axially and radially outwardly opening second passage having the axially inner end thereof opening to the axially outer end of said groove, an annular circumferential band surrounding said rim base and overlying a portion of said groove and the axially outer end thereof and cooperating with said groove to define second passage means, a tubeless type tire having one bead thereof seated on said rim base and the other bead thereof seated on said annular band to locate the uncovered portion of said groove within the interior of said tire, and control valve means within said first passage means controlling fluid flow to and from the interior of said tire through said first and second passage means.

References Cited in the file of this patent

UNITED STATES PATENTS

| | | |
|---|---|---|
| 2,731,063 | Powers | Jan. 17, 1956 |
| 2,840,133 | Billingsley | June 24, 1958 |
| 2,988,126 | Wells et al. | June 13, 1961 |

FOREIGN PATENTS

| | | |
|---|---|---|
| 582,973 | Great Britain | Dec. 3, 1946 |